(12) United States Patent
Morin et al.

(10) Patent No.: US 11,508,999 B2
(45) Date of Patent: Nov. 22, 2022

(54) LITHIUM-ION BATTERIES RECYCLING PROCESS

(71) Applicant: Recyclage Lithion Inc., Anjou (CA)

(72) Inventors: Dominique Morin, Anjou (CA); Charles Gagne-Bourque, Anjou (CA); Emilie Nadeau, Anjou (CA); Benoit Couture, Anjou (CA)

(73) Assignee: RECYCLAGE LITHION INC., Anjou (CA)

( * ) Notice: Subject to any disclaimer, the term of this patent is extended or adjusted under 35 U.S.C. 154(b) by 493 days.

(21) Appl. No.: 16/648,793

(22) PCT Filed: Sep. 27, 2018

(86) PCT No.: PCT/CA2018/051220
§ 371 (c)(1),
(2) Date: Mar. 19, 2020

(87) PCT Pub. No.: WO2019/060996
PCT Pub. Date: Apr. 4, 2019

(65) Prior Publication Data
US 2021/0376399 A1 Dec. 2, 2021

Related U.S. Application Data

(60) Provisional application No. 62/564,666, filed on Sep. 28, 2017.

(51) Int. Cl.
*H01M 6/52* (2006.01)
*H01M 10/54* (2006.01)
(Continued)

(52) U.S. Cl.
CPC ............ *H01M 10/54* (2013.01); *C22B 1/248* (2013.01); *C22B 3/26* (2021.05); *C22B 7/007* (2013.01);
(Continued)

(58) Field of Classification Search
CPC ......... H01M 10/4242; H01M 10/4207; H01M 8/008; H01M 4/382; C22B 13/045; C22B 26/12; C22B 7/007
See application file for complete search history.

(56) References Cited

U.S. PATENT DOCUMENTS 4,083,504 A   4/1978   Wattles et al.
7,192,564 B2  3/2007   Cardarelli et al.
(Continued)

FOREIGN PATENT DOCUMENTS

CN    107086334   8/2017
EP    2450991    5/2012
(Continued)

OTHER PUBLICATIONS

Elibama, "Li-ion Batteries Recycling, The batteries end of life . . . ", European Li-ion Battery Advanced Manufacturing for Electric Vehicles (Elibama) report (Oct. 2014).
(Continued)

*Primary Examiner* — Zulmariam Mendez
(74) *Attorney, Agent, or Firm* — Norton Rose Fulbright Canada LLP (57) ABSTRACT

It is provided a process for recycling lithium ion batteries comprising shredding the lithium-ion batteries and immersing residues in an organic solvent; feeding the shredded batteries residues in a dryer producing a gaseous organic phase and dried batteries residues; feeding the dried batteries residues to a magnetic separator removing magnetic particles; grinding the non-magnetic batteries residues; mixing the fine particles and an acid producing a metal oxides slurry and leaching said metal oxides slurry; filtering the leachate removing the non-leachable metals; feeding the leachate into a sulfide precipitation tank; neutralizing the leachate; mixing the leachate with an organic extraction solvent; separating cobalt and manganese from the leachate using solvent extraction and electrolysis; crystallizing sodium sulfate from the aqueous phase; adding sodium carbonate to the liquor and heating up the sodium carbonate and the liquor producing a precipitate of lithium carbonate; and drying and recuperating the lithium carbonate.

20 Claims, 4 Drawing Sheets

(51) Int. Cl.
  *C22B 1/248* (2006.01)
  *C22B 7/00* (2006.01)
  *C22B 3/00* (2006.01)
  *C22B 26/12* (2006.01)
  *C25B 1/22* (2006.01)
  *H01M 10/0525* (2010.01)
  *C22B 3/26* (2006.01)

(52) U.S. Cl.
  CPC ............ *C22B 23/043* (2013.01); *C22B 26/12* (2013.01); *C25B 1/22* (2013.01); *H01M 10/0525* (2013.01)

(56) References Cited

U.S. PATENT DOCUMENTS

| 7,820,317 | B2 | 10/2010 | Tedjar et al. |
| 9,327,291 | B2 | 5/2016 | Brodt |
| 2007/0196725 | A1* | 8/2007 | Tedjar ............... C22B 7/005 429/49 |
| 2012/0312126 | A1 | 12/2012 | Yamaguchi et al. |
| 2020/0078796 | A1 | 3/2020 | Kochhar et al. |
| 2020/0331002 | A1 | 10/2020 | Kochhar et al. |
| 2020/0331003 | A1 | 10/2020 | Kochhar et al. |

FOREIGN PATENT DOCUMENTS

| WO | 2017/006209 | 1/2017 |
| WO | 2017/091562 | 6/2017 |
| WO | 2017/145099 | 8/2017 |
| WO | 2018218358 | 12/2018 |

OTHER PUBLICATIONS

Ekberg et al. "Lithium Batteries Recycling", Lithium process Chemestry, Jan. 1, 2015, pp. 233-267.
Espinosa et al. "An Overview on the current processes for recycling of batteries", Journal of power sources, vol. 135, No. 1-2, 2004, pp. 311-319.
Rothermel et al. "Graphite Recycling from spent lithium-ion Batteries", Chemsuschem, vol. 9, No. 24, 2016, pp. 3473-3484.

* cited by examiner

LITHIUM-ION BATTERIES RECYCLING PROCESS

CROSS-REFERENCE TO RELATED APPLICATIONS

The present application is a U.S. National Phase of International Application No. PCT/CA2018/051220, filed on Sep. 27, 2018, and claiming priority from U.S. Provisional Application No. 62/564,666 filed Sep. 28, 2017, the content of which is hereby incorporated by reference in its entirety.

TECHNICAL FIELD

It is provided a process for recycling lithium-ion batteries.

BACKGROUND

Today, most lithium-ion batteries are recycled in a way that has a significant environmental footprint and fails to recover many valuable materials. Materials used for the manufacturing of lithium-ion batteries, such as lithium and cobalt, are projected to be at risk in the near feature and alternative source of those materials must be used to insure an affordable cost for lithium-ion batteries. Recycling is also necessary to obtain a positive environmental impact for the use of electric car, as the raw materials exploitation of the batteries components have a large environmental burden.

Some batteries recyclers focus on the mechanical and physical separation of the different components of the batteries such as the casing, current collector and the electrode materials after crushing. Those processes usually involve crushing the batteries under a controlled inert atmosphere. The crushed material is then separated by sieving, air and magnetic separation and sent to other facilities for further processing. Those types offer little in the way of producing value added component and are primarily useful to negate to environmental impacts of the handling of whole used batteries.

Pyrometallurgical processes can be used to separate the different elements of a spent lithium-ion battery. By heating at high temperature organics and polymers, component are burned. Heavier metals such as cobalt, copper and nickel are melted into an alloy, and the other elements end up in a slag. Metal alloys are sold to metal smelter for separation. Importantly, lithium is lost in the slag of those processes and can't be recuperated and sold. The alloy sold possesses a fraction of the value of the separated and pure metals.

Hydrometallurgical processes are often used after mechanical treatment to separate and purify the different metals contained in the cathode. Those processes usually involve a leaching step to dissolve the metals oxide into the aqueous solution and different steps of precipitations and separations to obtain relatively pure metals. Those types of processes are still in development and are expensive to operate because of steps such as liquid nitrogen immersion or use of large quantity of chemicals. Also, the treatment of liquid waste is usually barely taken under consideration.

There is currently no large scale industrial process which can handle the rising amount of used lithium-ion batteries. Even the smaller pilot plants are still at the research and development stage and can't process all the different batteries composition and purify the value added elements in an economical way.

There is thus still a need to be provided with a process which can economically process all types of used lithium-ion batteries.

SUMMARY

In accordance to the present disclosure, it is provided a process for recycling lithium ion batteries comprising the steps of shredding the lithium-ion batteries and immersing the residues in an organic solvent to safely discharge the batteries and producing shredded batteries residues and a liquid comprising organic compounds and lithium hexafluorophosphate; feeding the shredded batteries residues in a dryer producing a gaseous organic phase and dried batteries residues; feeding the dried batteries residues comprising magnetic and non-magnetic batteries residues to a magnetic separator removing magnetic particles from the dried batteries residues; grinding the non-magnetic batteries residues to a particle size of about 0.1-10 millimeters producing a particle size distribution comprising an upper range comprising plastics, and a middle and lower range of fine particles comprising aluminum, copper, metal and graphite; mixing the fine particles and an acid producing a slurry and leaching metal oxides slurry producing a leachate comprising metal sulfate and non-leachable materials; filtering the leachate to remove the non-leachable materials from the leachate; feeding the leachate into a sulfide precipitation tank removing ionic copper impurities from said leachate; neutralizing the leachate at a pH of 3.5 to 5 removing remaining iron and aluminum from said leachate; mixing the leachate with an organic extraction solvent producing an aqueous phase containing lithium, sodium and nickel and an organic phase containing cobalt, manganese and the remaining nickel; crystallizing sodium sulfate from the aqueous phase containing lithium producing a liquor containing lithium and sodium sulfate crystals; adding sodium carbonate to the liquor and heating up the sodium carbonate and the liquor producing a precipitate of lithium carbonate; and drying and recuperating the lithium carbonate.

In an embodiment, the organic solvent is an aliphatic carbonate.

In a further embodiment, the organic solvent is kept at a temperature under 40° C.

In an additional embodiment, the lithium ion batteries are shredded to a particle size of about 5-10 millimeters under an inert atmosphere using for example but not limited to nitrogen or $CO_2$.

In another embodiment, the shredded batteries residues are separated from the liquid by sieving or filtration.

In an additional embodiment, the process described herein further comprises evaporating the liquid in an evaporator, producing a slurry and a condensate of light organics.

In another embodiment, the process described herein comprises separating dimethyl carbonate (DMC), ethyl methyl carbonate (EMC), diethyl carbonate (DEC) and ethylene carbonate (EC) from the condensate of light organics.

In an embodiment, the liquid is evaporated at a temperature from 90° C. to 126° C.

In another embodiment, the slurry is burned at a temperature of about 500° C. producing a combustion gas comprising hydrofluoric acid (HF) and phosphorus pentoxide ($P_2O_5$).

In another embodiment, the HF is further removed in a fluidized bed reactor and the $P_2O_5$ is neutralized in a wet scrubber forming sodium phosphate ($Na_3PO_4$).

In an embodiment, the shredded batteries residues are dried at a temperature between 200-300° C.

In an embodiment, the non-magnetic batteries residues are grinded in a hammer mill or in an impact crusher.

In an embodiment, the process described herein further comprises extracting with an eddy current separator the aluminum and copper from the grinded non-magnetic batteries.

In another embodiment, the aluminum and copper are further separated.

In an embodiment, the fine particles are mixed with sulfuric acid and water.

In a further embodiment, the fine particles and the acid are mixed to produce the metal oxides slurry at a solid concentration between 75 to 125 kg of solid per cubic meters of acid solution.

In another embodiment, the process described herein further comprises adding a reduction agent to the metal oxides slurry for leaching.

In an embodiment, the reduction agent is at least one of hydrogen peroxide ($H_2O_2$), manganese oxide ($MnO_2$), aluminum powder (Al) and a combination thereof.

In another embodiment, the process described herein further comprises purifying the graphite from the non-leachable materials in a furnace.

In an embodiment, the furnace is operating at a temperature of about 200 to 800° C.

In an embodiment, the process described herein further comprises precipitating the ionic copper impurities by precipitation with sulfide ions.

In a further embodiment, the process described herein further comprises precipitating aluminum and iron impurities by raising the pH of the aqueous solution.

In another embodiment, the process described herein further comprises mixing the leachate and the organic extraction solvent in a diluent.

In a further embodiment, the diluent is a petroleum-based reagent.

In an embodiment, the process described herein further comprises scrubbing and stripping the organic phase to extract cobalt and manganese.

In another embodiment, the cobalt and manganese are separated by electrowinning.

In an additional embodiment, the process described herein further comprises increasing the pH of the aqueous phase to a pH between 10 and 12 to precipitate the nickel sulfate ($NiSO_4$) as nickel hydroxide ($Ni(OH)_2$) from said aqueous phase.

In an embodiment, the aqueous phase is cooled at a temperature of between about 0° C. and 10° C. before crystallization.

In another embodiment, the process described herein further comprises electrolysing the sodium sulfate crystals producing sulfuric acid and sodium hydroxide.

In an embodiment, the carbonate ions are added to the liquor by feeding sodium carbonate or bubbling $CO_2$ gas.

In a further embodiment, the lithium ion batteries are batteries pack.

In another embodiment, the lithium ion batteries are car batteries.

BRIEF DESCRIPTION OF THE DRAWINGS

Reference will now be made to the accompanying drawings.

It will be noted that throughout the appended drawings, like features are identified by like reference numerals.

DETAILED DESCRIPTION

In accordance with the present description, there is provided a process for recycling lithium ion batteries.

The present disclosure provides a process for recycling lithium ion batteries comprising the steps of shredding the lithium-ion batteries and immersing the residues in an organic solvent to safely discharge the batteries and producing shredded batteries residues and a liquid comprising organic compounds and lithium hexafluorophosphate; feeding the shredded batteries residues in a dryer producing a gaseous organic phase and dried batteries residues; feeding the dried batteries residues comprising magnetic and non-magnetic batteries residues to a magnetic separator removing magnetic particles from the dried batteries residues; grinding the non-magnetic batteries residues producing a particle size distribution comprising an upper range comprising plastics, and a middle and lower range of fine particles comprising aluminum, copper, metal and graphite; mixing the fine particles and an acid producing a slurry and leaching metal oxides slurry producing a leachate comprising metal sulfate and non-leachable materials; filtering the leachate to remove the non-leachable materials from the leachate; feeding the leachate into a sulfide precipitation tank removing ionic copper impurities from said leachate; neutralizing the leachate at a pH of 3.5 to 5 removing remaining iron and aluminum from said leachate; mixing the leachate with an organic extraction solvent producing an aqueous phase containing lithium, sodium and nickel and an organic phase containing cobalt, manganese and the remaining nickel; crystallizing sodium sulfate from the aqueous phase containing lithium producing a liquor containing lithium and sodium sulfate crystals; adding sodium carbonate to the liquor and heating up the sodium carbonate and the liquor producing a precipitate of lithium carbonate; and drying and recuperating the lithium carbonate.

The process described herein is designed to be able to handle all cathode composition of lithium ion batteries available on the market. The process described herein can be implemented in a plant which can also process all forms of batteries packs, including plastic casing and support, to limit manual dismantling.

Used batteries entering their end of life can be of different composition. The cathode is usually made of a lithium metal oxide with the metal portion made of a mix of cobalt, nickel and manganese. Other cathode composition such as lithium iron phosphate can also be processed. The anode is often made of graphite but can also be composed of metallic lithium. The electrolyte can either be a liquid solvent, usually a mix of an aliphatic carbonate and a cyclic carbonate with a dissolved lithium salt or a solid, such as a lithium based solid electrolyte.

Organic Separation

Figure 1:
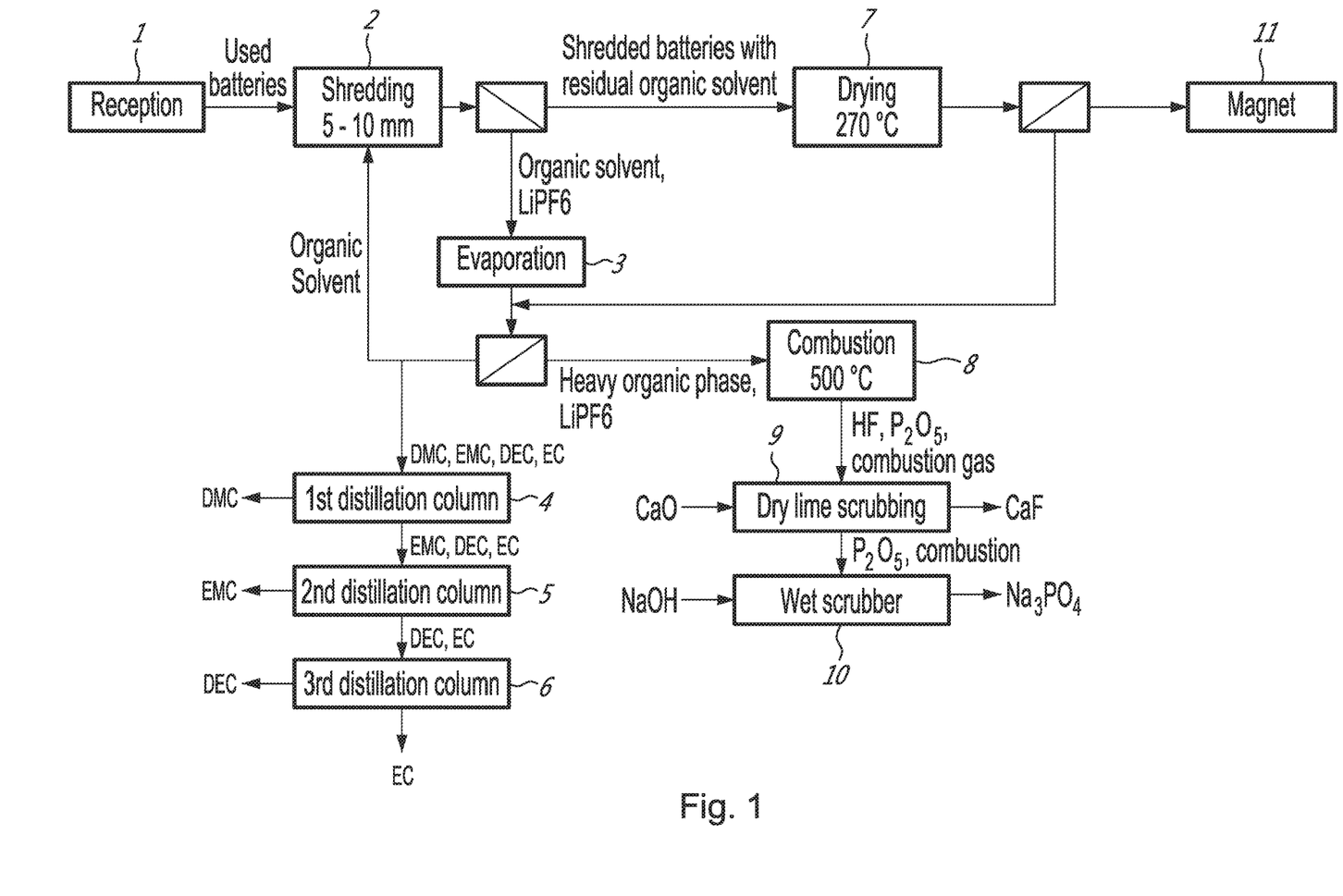
FIG. 1 illustrates schematically the organic separation steps of the process encompassed herein and in accordance to an embodiment.

As seen in FIG. 1, the process comprises a first step of shredding 2 the used batteries received 1 to safely discharge and expose the inside components of the batteries to the electrolyte extraction downstream. In an embodiment, the shredding is done to a target particle size of about 5 to 10 millimetres.

The used batteries may have charge left in them. If the inside components of a charged battery are exposed to the moisture contained in the ambient air, an exothermic reaction occurs which produces hydrogen gas. This incurs a severe risk of combustion of the hydrogen gas. To minimise the risk of combustion, whole used batteries are shredded and then immersed in an organic solvent. This organic solvent is used to dissolve and extract the electrolyte salt contained in the batteries, such as lithium hexafluorophosphate ($LiPF_6$). It is miscible with the electrolyte solvent found in batteries cells, preferably an aliphatic carbonate. Hence, contact between the inside components of the batteries and the oxygen is then limited. Also, in the event of an exothermic reaction, the organic solvent will serve as a heat sink thus reducing operating hazards. In an embodiment, the organic solvent is kept under 40° C. by either circulating the solvent through a heat exchanger or with a jacket around the vessel receiving the shredded batteries.

Following the shredding 2, the particles or shredded batteries residues, and the solvent undergo an extraction step to insure a good washing of the electrolyte salt. The extractant is the same solvent used for the shredding step 2. In an embodiment, the extraction is done at temperatures between 40° C. to 60° C., with a residence time between 30 minutes to an hour and a half, with tested operating point of 50° C. for 1 hour. This step can be done in any typical heated and mixed tank unit. Then, the shredded batteries residues or particles are separated from the liquid by sieving or filtration.

The liquid phase, containing the organic solvent, is fed to an evaporator 3 operating at the boiling point of the solvent mixture, which can vary from 90° C. for pure dimethyl carbonate for example, up to 126° C. for pure diethyl carbonate. Typical operating point for a mixture of electrolyte salt and solvent is expected to be at about 90° C., at atmospheric pressure. The lighter molecules of the organic phase, primarily the solvent used upstream, will be evaporated and condensed. The heavier organic molecules still containing the electrolyte salt from the used batteries will remain as a slurry in the bottom of the evaporator.

Most of the condensate of light organics can be returned to the shredding step 2, the other part corresponding to the accumulation of organic solvent, is bled towards a separation step 4 in order to purify the different molecules in the light organic phase. The light organic phase is composed of organic carbonate compound such as, but not limited to, dimethyl carbonate, ethyl methyl carbonate, diethyl carbonate and ethylene carbonate. In an embodiment, three distillation columns are used. The first column 4a is operated at around 90° C. to obtain battery grade dimethyl carbonate (DMC) in the column overhead. The second column 4b is fed with the bottom of the first column. This contained ethyl methyl carbonate (EMC), diethyl carbonate (DEC) and ethylene carbonate (EC). The second column is operated at around 107° C. to obtain battery grade ethyl methyl carbonate (EMC) in the column overhead. The second column bottom is fed to the third column 4c and is operated at around 126° C. to obtain battery grade diethyl carbonate (DEC) in the column overhead and technical grade ethylene carbonate (EC) from the column bottom.

Figure 2:
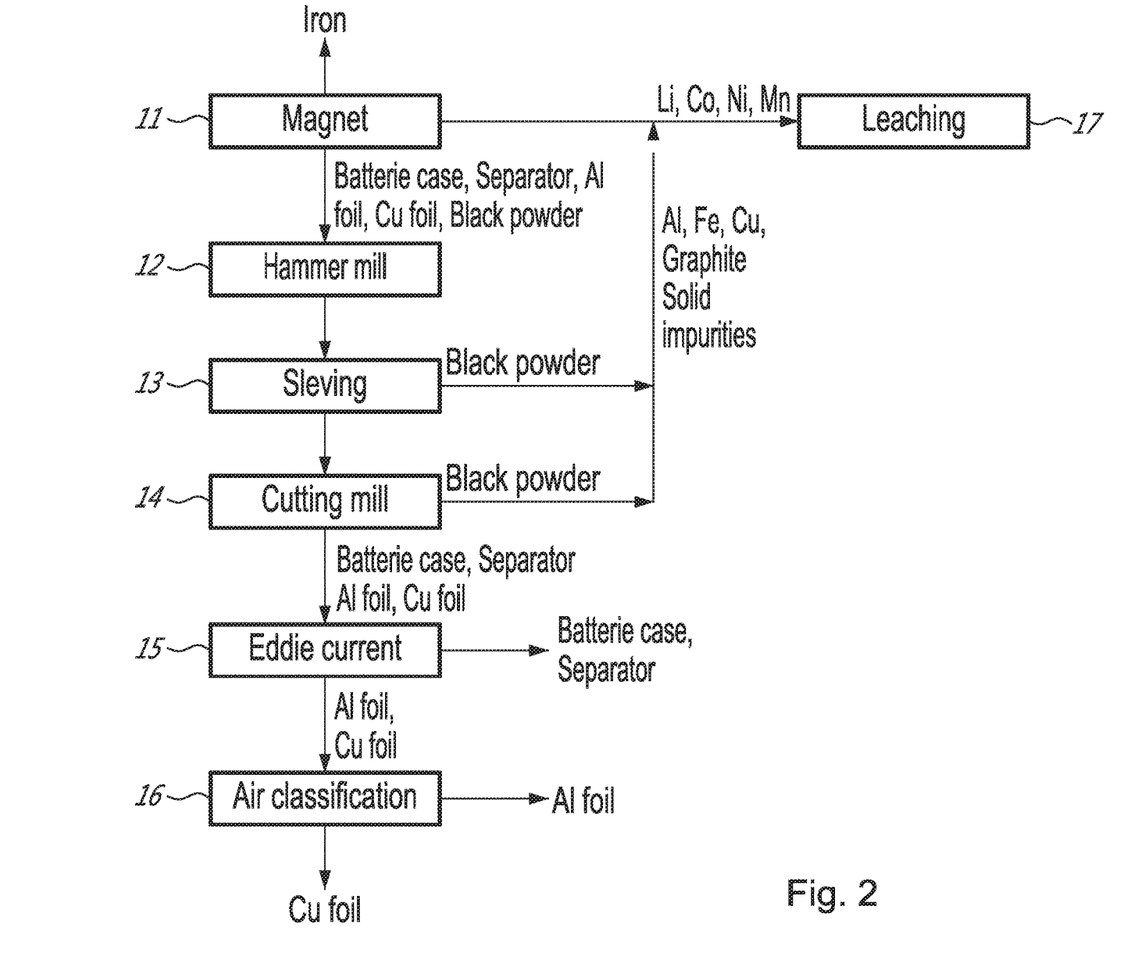
FIG. 2 illustrates schematically the electro-mechanical separation steps of the process encompassed herein and in accordance to an embodiment.

A dryer 7, operating between 200 and 300° C., will be fed with the wetted batteries residues to eliminate the organic solvent from the residues. The gaseous phase containing mostly light organics will be sent to the first solvent evaporation 3 outlet. Battery residues from the dryer outlet 7 is fed to a magnetic separator 11.

The heavy organics slurry from the evaporator 3, is burned off 8 at a temperature around 500° C. to eliminate the toxic organofluorophosphate molecules and remove all reactive fluoride compounds from the process. The combustion gas will contain hydrofluoric acid (HF) and phosphorous pentoxide ($P_2O_5$); those molecules are highly reactive and need to be treated before being sent to the environment. HF is removed by dry scrubbing 9, such as, but not limited to, a dry lime scrubber or an catalysed alumina dry scrubber, where the waste product can be safely treated by any aluminum plant as part of their fed product. $P_2O_5$ is neutralized in a wet scrubber 10 using a caustic solution, forming waste products such as sodium phosphate ($Na_3PO_4$) which is environmentally harmless.

Electro-Mechanical Separation

Battery residues are fed from the dryer outlet 7 to a magnetic separator 11 in order to separate iron pieces and particles which are lifted to the magnets, from the other solids.

The non-magnetic batteries residues undergo a comminution step 12, or reduction of the average particle size to a smaller average particle size, to a particle size between 0.1 to 2 millimeters. Different crushing and grinding unit operation can be used such as, but not limited to, a hammer mill or an impact crusher. The plastics will form the upper range of the particle size distribution. The aluminum and the copper foils will be crushed to a ribbon-like form. The metal in the cathode and the graphite in the anode will be pulverized and form the lower range of the particle size distribution.

In an embodiment, the outlet from the crusher is then sieved 13 at around 1 millimeter. The oversize fraction is fed to a second milling and sieving step 14 to remove the remaining anode and cathode materials stuck to the aluminum and copper foil using an equipment such as, but not limited to, a high shear mixer or a cutting mill for example. After the second sieving at the same size (~1 mm), the fine particles of step 14 are sent to be mixed with the fine particles from the previous sieve 13.

The coarse particles, containing mostly plastics, copper, and aluminum are then fed to an eddy current separator 15 where the aluminum and copper foil are extracted. The remaining plastic can be sent to a recycling facility. The aluminum and copper foils are then separated by density classification 16 using an equipment such as, but not limited to, an air classifier.

Hydrometallurgical Treatment

Figure 3:
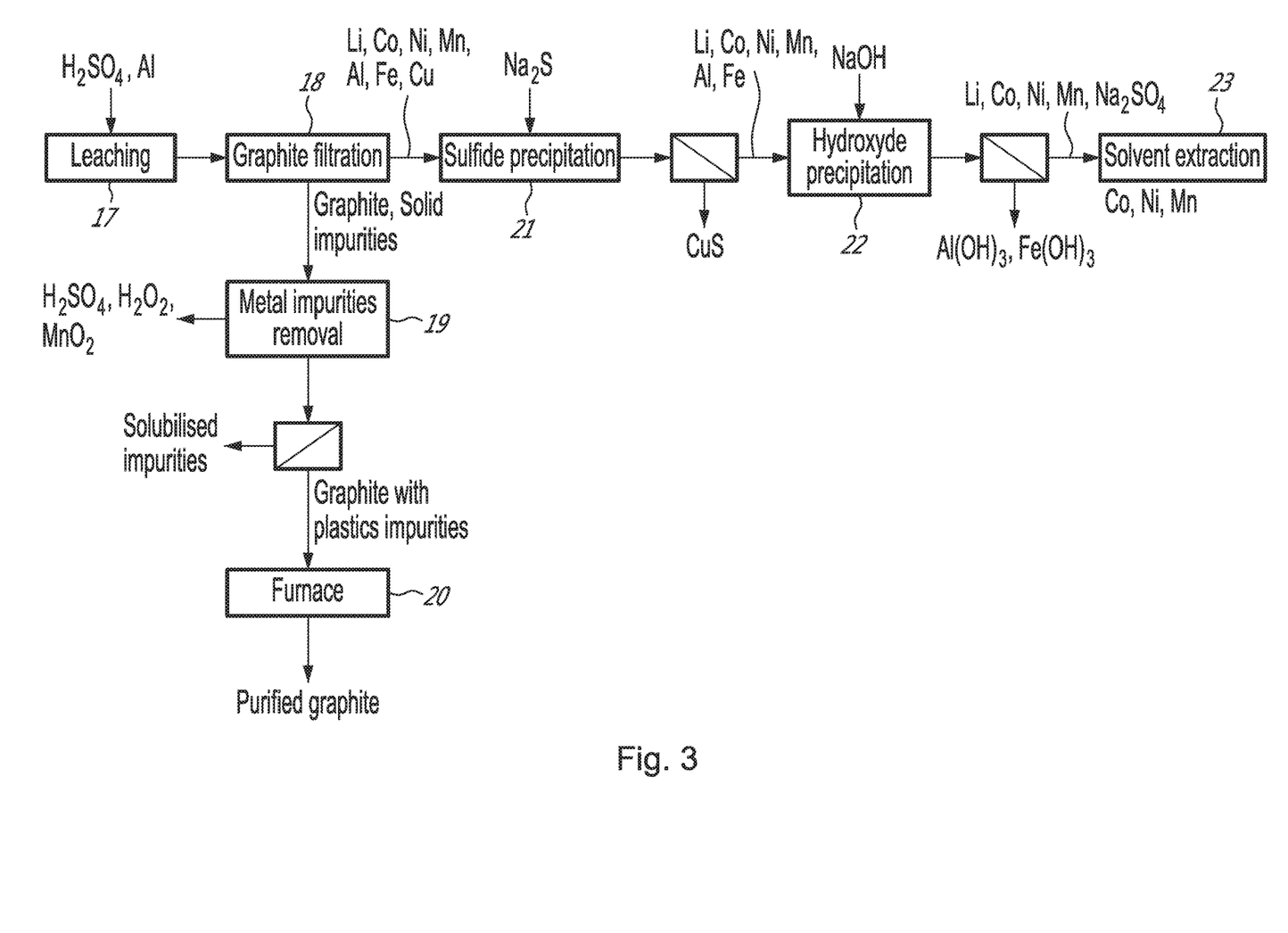
FIG. 3 illustrates schematically the hydrometallurgical treatment steps of the process encompassed herein in accordance to an embodiment.

In a leaching tank 17, the fine particles from the sieving units are mixed with sulfuric acid and water, to obtain a metal oxides slurry with an acidic mass concentration between 10% and 30% in the liquid phase of the slurry, with an operating point around 17%. The mixing needs to be maintained around ambient temperature, for 1 to 4 hours, for a solid concentration between 75 to 125 kg of solids per cubic meters of acid solution. Typical operation should be done at ~20° C., for 3 hours, at a solid concentration of 100 kg/m³.

A reduction agent may also be added to the reaction tank to help leach transition metals, such as, but not limited to, hydrogen peroxide ($H_2O_2$), manganese oxide ($MnO_2$), or aluminum powder (Al). Typical operating concentrations of the reducing agents may vary from 0 to 30% w./w. of solution for the $H_2O_2$, 0 to 5% w./w. for the $MnO_2$, and 0 to 5% w./w. for Al. The transition metals in the slurry (Co, Ni, Mn) are reduced, or oxidised, to a divalent (2+) oxidation state, at which they are more readily leachable. Leaching of the metal oxides slurry produces a leachate of metal sulfate which is filtered from solid non leachable materials.

As seen in FIG. 3, the graphite and the others non-leachable elements are filtered out 18 and sent to graphite purification. The filtrate, containing the lithium, cobalt, nickel, manganese, iron, aluminum and copper as sulfate salt ($Li_2SO_4$, $CoSO_4$, $NiSO_4$, $MnSO_4$, $Fe_2(SO_4)_3$, $Al_2(SO_4)_3$, $CuSO_4$), is sent to sulfide precipitation 21.

After filtration, the obtained graphite cake is suspended back 19 in a liquid similar to the aqueous solution from the leaching step. It is also a mixture of sulfuric acid and a reducing agent such as, but not limited to, hydrogen peroxide ($H_2O_2$), manganese dioxide ($MnO_2$), or aluminum powder (Al), using the same range of composition as before. This solution solubilises the remaining metals in the graphite. The graphite is then filtered and thoroughly washed with water. The graphite cake is then fed into a furnace 20 operating between 200 to 800° C., preferably 600° C., for the remaining plastics to be evaporated and the graphite dried.

The leachate is sent to the sulfide precipitation tank 21 to remove the ionic copper in solution, coming from the leached metallic copper that was left over after the Eddy current separation. The copper impurities can be precipitated by binding with sulfide ions ($S^-$). The source of sulfide ions can be any sulfide ionic compound such as, but not limited to, sodium sulfide ($Na_2S$) or bubbling hydrogen sulfide ($H_2S$). At a pH under 2 and at temperatures between 40 to 80° C., the sulfide will selectively bind to copper to form copper sulfide (CuS) which is insoluble in water. Depending on the concentration of copper ions in solution, concentration of $Na_2S$ may vary between 2 and 5 kg of $Na_2S$ per kg of batteries residues leached, and retention time from 30 min. to 1 hour. The precipitate will be eliminated from the main process line by filtration and sold.

$$CuSO_4 + Na_2S \leftrightarrow CuS + Na_2SO_4$$

The leachate is then neutralized 22 to a pH between 3.5 and 5.0 with the addition of sodium hydroxide (NaOH) to precipitate the remaining iron and aluminum, which will form hydroxides ($Al(OH)_3$, $Fe(OH)_3$) that are insoluble in water. The precipitation takes between 30 min. to 2 hours to stabilise, with an expected reaction time of 1 hour. The precipitate is filtrated out of the process.

$$Al_3(SO_4)_2 + 6NaOH \leftrightarrow 3Al(OH)_3 + 2Na_2SO_4$$

$$NiSO_4 + 2NaOH \leftrightarrow Ni(OH)_2 + Na_2SO_4$$

Final Metal Separation

Figure 4:
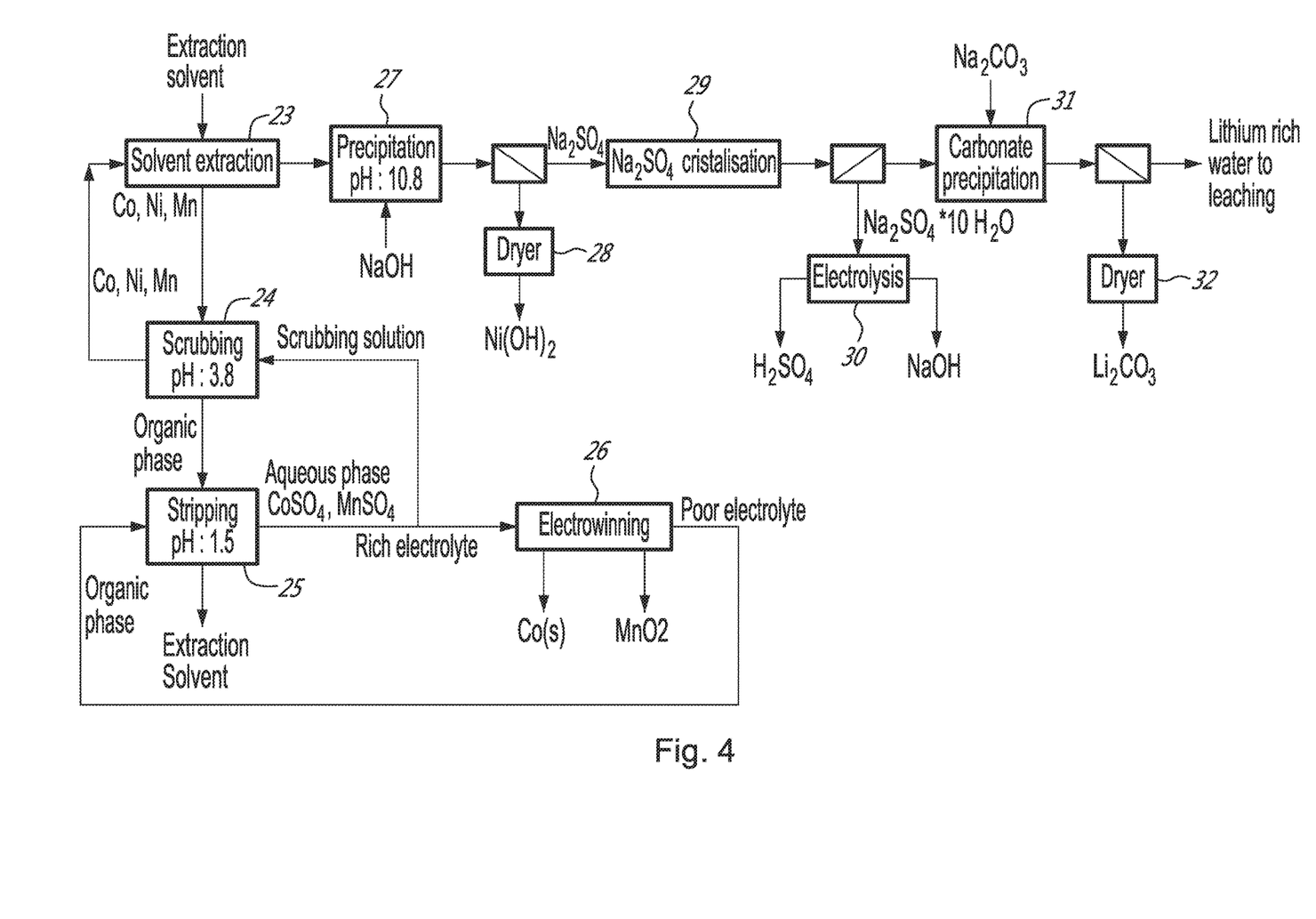
FIG. 4 illustrates schematically the multiple metal separations steps after the solvent extraction step encompassed herein in accordance to an embodiment.

The leachate is mixed with an organic extraction solvent (extractant) dissolved in a petroleum-based reagent (diluent) 23. The concentration of the extractant in the diluent may vary between 2 and 10 mass percentage, with a more typical value between 4 and 6. With the aqueous solution at a pH between 4.5 and 7, the divalent transition metals (Co, Mn, Ni) will be extracted by the organic phase, while the lithium and sodium will remain in the aqueous phase. If the pH is kept at values between 5.4 and 6.2, nickel will only be partially extracted. This pH range is used to separate nickel from cobalt and manganese.

For carrying out the solvent extraction processes, mixer-settlers, extraction columns, such as pulse columns, columns with internal stirring using rotating impellers, reciprocating-plate extraction columns, hollow fiber membrane and the like may be used. For the mentioned equipment, the lighter organic phase is typically pumped out from the top of a buffer zone (where there is no more mixing), and the heavier aqueous phase goes out from the bottom of the equipment, through another buffer zone where it is given enough time to separate by decantation. The organic phase is then sent to a scrubbing and stripping stage, and the aqueous phase (raffinate) is sent to further precipitation steps.

In the scrubbing stage 24, the organic phase is contacted with an aqueous solution with a high concentration of cobalt and manganese to selectively strip nickel from the organic phase. This scrubbing solution is a portion of the (Co, Mn)-rich stripping solution, with its pH adjusted between 3 and 4 with sodium hydroxide. The two phases are mixed and separated in similar equipment as previously described above. The aqueous solution is returned and mixed with the solvent extraction inlet.

In the stripping stage 25, the organic phase is contacted with an aqueous solution containing sulfuric acid with a pH between 1 and 2 to strip the cobalt and manganese together. Once again, similar equipment as previously described are used here to mix and separate the two phases. The cleaned organic solvent is then fed back to the extraction stage and the now-(Co, Mn)-rich aqueous phase is split between the scrubbing stage 24 and the cobalt electrowinning step 26.

Cobalt and manganese must be separated from each other. They would be precipitated together if neutralized with sodium hydroxide, but as they have different standard reduction potentials (−0.28 V for cobalt and −1.18 V for manganese), they can be separated by an electrowinning process 26. The cobalt will be plated in its metallic form on the cathode and then scrapped off. Manganese will be oxidised to $MnO_2$ and deposited on the anode. Cobalt electrowinning is done using an undivided electrolysis cell with cobalt blank cathode and a DSA anode with a current density between 150 and 350 A/m² with a voltage between 2.7 to 5 V. The electrolyte is fed at a pH between 2.5 and 5 at a temperature between 45 and 70° C. The spent electrolyte is returned to the stripping step 25 as the stripping solution. The electrode reactions are as follows:

Cathode:

$$Co^{2+} + 2e^- \leftrightarrow Co(s)$$

$$2H^+ + 2e^- \leftrightarrow H_2$$

Anode:

$$H_2O \leftrightarrow \tfrac{1}{2}O_2 + 2H^+ + 2e^-$$

$$MnO_2(s) + 2e^- + 4H^+ \leftrightarrow Mn^{2+} + 2H_2O$$

After the solvent extraction step, the aqueous raffinate contains a large proportion of dissolved nickel sulfate ($NiSO_4$). The pH of the solution is increased between 10 and 12, with an expected value of 10.8, with the addition of sodium hydroxide 27 to precipitate nickel hydroxide ($Ni(OH)_2$). The precipitation takes between 30 min. to 2 hours to stabilise, with an expected reaction time of 1 hour. The nickel hydroxide is filtrated, washed, and dried 28 to be sold.

$$NiSO_4 + 2NaOH \leftrightarrow Ni(OH)_2 + Na_2SO_4$$

At this point in the process, the remaining aqueous solution contains an important proportion of sodium sulfate ($Na_2SO_4$). The sodium sulfate is produced by the neutralisation of sulfuric acid with sodium hydroxide which happens during the hydroxide precipitation. The high concentration of sodium sulfate, combined with the important dependency of its solubility to the temperature, makes it appealing for surface cooled crystallisation 29. By cooling the neutralised leachate between 0° C. and 10° C., a large proportion of the sodium sulfate is crystallised into a decahydrate crystal known as Glauber's salt ($Na_2SO_4*10H_2O$). Removing sodium sulfate as a hydrated crystal also has the benefit of concentrating the remaining lithium in the aqueous solution (mother liquor). The produced crystals are fed to a centrifuge to be dewatered and washed.

$$Na_2SO_4+10H_2O \leftrightarrow Na_2SO_4*10H_2O$$

The sodium sulfate crystal produced will have a high level of purity, due to the numerous purification step upstream. The lack of contamination makes the electrolysis 30 possible, as only a few parts per million of multivalent metal ions in solution will results in precipitation in the electrolysis cells membrane. The electrolysis of sodium sulfate will produce sulfuric acid at the anode and sodium hydroxide at the cathode, which are the main required consumable reagent of the process. This step will eliminate the need to feed fresh sulfuric acid and sodium hydroxide to the process. For this type of process, current density may vary between 1 to 3 $kA/m^2$, while the corresponding voltage may vary from 5 to 20V, for a constant bath temperature of 25° C., and a $Na_2SO_4$ feed mass percentage between 15 to 25%. Expected operation values should be at a current density of 1 kA/m2, for a voltage of 10V, for a feed $Na_2SO_4$ mass percentage around 18%. The electrode reactions are as follows:

Cathode:

$$2H_2O+2e^- \leftrightarrow H_2+2OH^-$$

$$2Na^++2OH^- \leftrightarrow 2NaOH$$

Anode:

$$H_2O \leftrightarrow \tfrac{1}{2}O_2+2H^++2e^-$$

$$SO_4^{2-}+2H^+ \leftrightarrow H_2SO_4$$

The mother liquor out of the crystalliser is heated up to a temperature between 80 to 100° C. and a source of carbonate ions ($CO_3^{2-}$) is added to the aqueous solution. The carbonate ion source can be either a carbonate ionic compound such as sodium carbonate ($Na_2CO_3$), or by bubbling $CO_2$ gas producing carbonate acid ions ($HCO_3^-$). The carbonate ions react with lithium ions to produce lithium carbonate ($Li_2CO_3$) 31, which is slightly soluble in water. The precipitation is expected to take between 30 min. to 2 hours to stabilise, with an operation retention time of 1 hour. The precipitate is filtered and dried 32 and sold as dried lithium carbonate.

$$Li_2SO_4+CO_3^{2-} \leftrightarrow Li_2CO_3+Na_2SO_4$$

The remaining aqueous solution is recycled back to the primary leaching sector to prevent sending lithium to the water treatment.

Example I

All the processes of the battery recycling process described in the following examples are made continuously in a laboratory scale. They include shredding, grinding, sieving, electrolyte solvent extraction, leaching, precipitation (sulfide, hydroxide and carbonation), extraction by solvent, electrowinning and crystallisation. Firstly, batteries are shredded roughly, and electrolyte solvent is recovered by evaporation. The shredded solids are then finely grinded, before being sieved and magnetised for plastic and iron removal respectively and leached. $Na_2S$ is added to the leachate to obtain a sulfide precipitate, then the pH of the resulting leachate is increased to obtain a hydroxide precipitate. The leachate is then contacted with an organic solvent. This organic solvent is then scrubbed, stripped and finally forwarded to an electrowinning cell. The pH of the aqueous solution is increased again to obtain a nickel hydroxide. After, its temperature is decreased for sodium removal and then increased for carbonation precipitation.

First, around 150 g of batteries are shredded, immerged in a dimethyl carbonate solvent and heated at 110° C. in a flask. After filtration, lithium salt ($LiPF_6$) is then recovered by distilling the solvent. Shredded batteries are then grinded into 0.1-2 mm parts and are ready to be leached.

Leaching needs 2 mol/L of 98% concentrated sulfuric acid and 1.6 mL of hydrogen peroxide per gram of metal powder. Leaching time can take up to 4 hours. The residues are washed with distilled water and filtered.

After filtration, the next step is sulfur precipitation for copper removal. 10 wt % of sodium sulfide compared to metal powder is added to the leachate to precipitate copper sulfide (CuS). It is then washed and filtered. Reaction took at least 30 minutes for completion.

Then, after filtration, approximately 40 g of sodium hydroxide is added to the leachate to get a pH from 0 to 5.5 to obtain an iron and aluminum hydroxide precipitate. The hydroxide precipitate was difficult to filter because the gel-like properties of iron hydroxide. This amount of NaOH was for 50 g of metallic powder with 2 mol/L of $H_2SO_4$. The precipitate is washed and filtered.

The leachate is then in contact with a diluted organic solvent, which is a mixture of 10 v. % of cyanex 272 and 90 v. % of naphta, with a 1:1 organic leachate ratio. The aqueous phase is rich in nickel and lithium. The organic phase is scrubbed and stripped so that cobalt and manganese can be recovered. It is recycled to the initial operation of extraction by solvent.

The pH of the cobalt and manganese concentrated solution is set to 3.5, then it is transferred to the electrowinning cell, which we applied a current density of about 200 A/m2. After one hour of electrowinning at 50° C., metallic cobalt is plated on the iron cathode and dioxide manganese is deposed on the lead anode.

The pH of the aqueous phase, rich in nickel and lithium following the extraction by solvent, is increased to 10.8 to obtain a nickel hydroxide precipitate. It is filtrated and washed.

The pH of the aqueous phase is adjusted to 8. It is then cooled in an ice bucket to 5° C. for 30 minutes to extract sodium sulfate. It is filtrated and washed.

The aqueous phase is then heated to 90° C. and sodium carbonate is added to have a carbonation reaction and to form lithium carbonate. The precipitate is filtrated and washed. The reaction is taking 1 hour.

The following tables show the analysis of the precipitates and the efficiency of the operations:

TABLE 1

| Operations | Parameter | Values |
| --- | --- | --- |
| Leaching solids (graphite) | Efficiency (% w/w) | 98.5 |
| CuS precipitation | Efficiency (% w/w) | 99 |
| Al—Fe hydroxide precipitation | Efficiency (% w/w) | 97 |
| $Na_2SO_4$ | Purity (% w/w) | 99.9 |

Example II

The process of Example 1 was repeated except that 3 more operations were added: sieving, magnetism for iron removal and reusing the last aqueous solution which contains a small quantity of lithium.

Sieving was used to separated metallic powder from undesirable residues (plastic and metal parts) before the metallic powder was being leached. The small parts of iron are then removed my magnetism. The addition of these two operations helped to reduce both the amount of iron precipitate and hydroxide filtration time.

Recycling the last aqueous solution, which contains a small quantity of lithium, back to the leaching step will not only respect the environmental standards and save water, but it will also recover the remaining lithium that haven't been carbonated.

TABLE 2

| Operations | Parameter | Values |
|---|---|---|
| Nickel precipitation | Purity (% w/w) | 99.3 |
| Solvent extraction | Cobalt extraction (% w/w) | 99.9 |
| Solvent extraction | Ni/Co separation factor | 4 000 |

Example III

In this example, in order to further improve the efficiency of the leaching operation, the leaching operation is repeated.

The efficiency of the leaching operation is improved by optimizing its parameters. Reducing agents, such as 10 g/L of aluminum (foil) or 4 g/L of manganese dioxide, are used to substitute partially or entirely the hydrogen peroxide. Adding 1.6 mL/g $H_2O_2$ and 4 g/L $MnO_2$ seemed to be the most efficient.

| Operations | Parameter | Values |
|---|---|---|
| Sulfuric acid only | Metal remaining in the solid (PPM) | 119 000 |
| Sulfuric acid + aluminum | Metal remaining in the solid (PPM) | 27 350 |
| Sulfuric acid + $H_2O_2$ + $MnO_2$ | Metal remaining in the solid (PPM) | 2 496 |

While the present disclosure has been described with particular reference to the illustrated embodiment, it will be understood that numerous modifications thereto will appear to those skilled in the art. It will be understood that it is capable of further modifications and this application is intended to cover any variations, uses, or adaptations, including such departures from the present disclosure as come within known or customary practice within the art and as may be applied to the essential features hereinbefore set forth, and as follows in the scope of the appended claims.

What is claimed is:

1. A process for recycling lithium-ion batteries comprising the steps of:
   a) shredding the lithium-ion batteries and immersing the residues in an organic solvent to safely discharge the batteries and producing shredded batteries residues and a liquid comprising organic compounds and lithium hexafluorophosphate;
   b) feeding the shredded batteries residues in a dryer producing a gaseous organic phase and dried batteries residues;
   c) feeding the dried batteries residues comprising magnetic and non-magnetic batteries residues to a magnetic separator removing magnetic particles from the dried batteries residues;
   d) grinding the non-magnetic batteries residues producing a particle size distribution comprising an upper range comprising plastics, and a middle and lower range of fine particles comprising aluminum, copper, metal and graphite;
   e) mixing the fine particles and an acid producing a slurry and leaching the slurry producing a leachate comprising metal sulfate and non-leachable materials;
   f) filtering the leachate to remove the non-leachable materials from the leachate;
   g) feeding the leachate into a sulfide precipitation tank removing ionic copper impurities from said leachate;
   h) neutralizing the leachate at a pH of 3.5 to 5 removing remaining iron and aluminum from said leachate;
   i) mixing the leachate with an organic extraction solvent producing an aqueous phase containing lithium and an organic phase containing cobalt, manganese and nickel;
   j) crystallizing sodium sulfate from the aqueous phase containing lithium producing a liquor containing lithium and sodium sulfate crystals;
   k) adding sodium carbonate to the liquor and heating up the sodium carbonate and the liquor producing a precipitate of lithium carbonate; and
   l) drying and recuperating the lithium carbonate.

2. The process of claim 1, wherein the organic solvent is an aliphatic carbonate.

3. The process of claim 1, wherein the lithium ion batteries are shredded to a particle size of about 5-10 millimeters.

4. The process of claim 1, wherein the shredded batteries residues are separated from the liquid by sieving or filtration.

5. The process of claim 1, further comprising evaporating the liquid of step a) in an evaporator, producing a slurry and a condensate of light organics.

6. The process of claim 5, comprising separating dimethyl carbonate (DMC), ethyl methyl carbonate (EMC), diethyl carbonate (DEC) and ethylene carbonate (EC) from the condensate of light organics.

7. The process of claim 5, further comprising recycling the condensate of light organics as the organic solvent in step a).

8. The process of claim 1, wherein the shredded batteries residues are dried at a temperature between 200-300° C.

9. The process of claim 1, wherein the non-magnetic batteries residues are grinded in a hammer mill or in an impact crusher.

10. The process of claim 1, further comprising extracting with an eddy current separator the aluminum and cooper from the grinded non-magnetic batteries.

11. The process of claim 10, wherein the aluminum and copper are further separated.

12. The process of claim 1, wherein the fine particles are mixed with sulfuric acid and water to produce a metal oxides slurry at a solid concentration between 75 to 125 kg of solid per cubic meters of acid solution.

13. The process of claim 1, further comprising adding a reduction agent to the metal oxides slurry for leaching.

14. The process of claim 13, wherein the reduction agent is at least one of hydrogen peroxide ($H_2O_2$), manganese oxide ($MnO_2$), aluminum (Al) and a combination thereof.

15. The process according to any of the preceding claims, further comprising filtering the graphite from the leachate and purifying it in a furnace.

16. The process of claim 1, further comprising precipitating the ionic copper impurities by precipitation with sulfide ions.

17. The process of claim 1, further comprising mixing the leachate and the organic extraction solvent in step j) in a diluent.

18. The process of claim 1, further comprising scrubbing and stripping the organic phase from step i) to extract cobalt and manganese.

19. The process of claim 1, further comprising increasing the pH of the aqueous phase to a pH between 10 and 12 to precipitate the nickel from said aqueous phase.

20. The process of claim 1, further comprising electrolysing the sodium sulfate crystals producing sulfuric acid and sodium hydroxide.

\* \* \* \* \*